May 20, 1969    M. W. CARROLL ET AL    3,445,145
TWO-PIECE JOURNAL BEARING
Filed Nov. 22, 1967
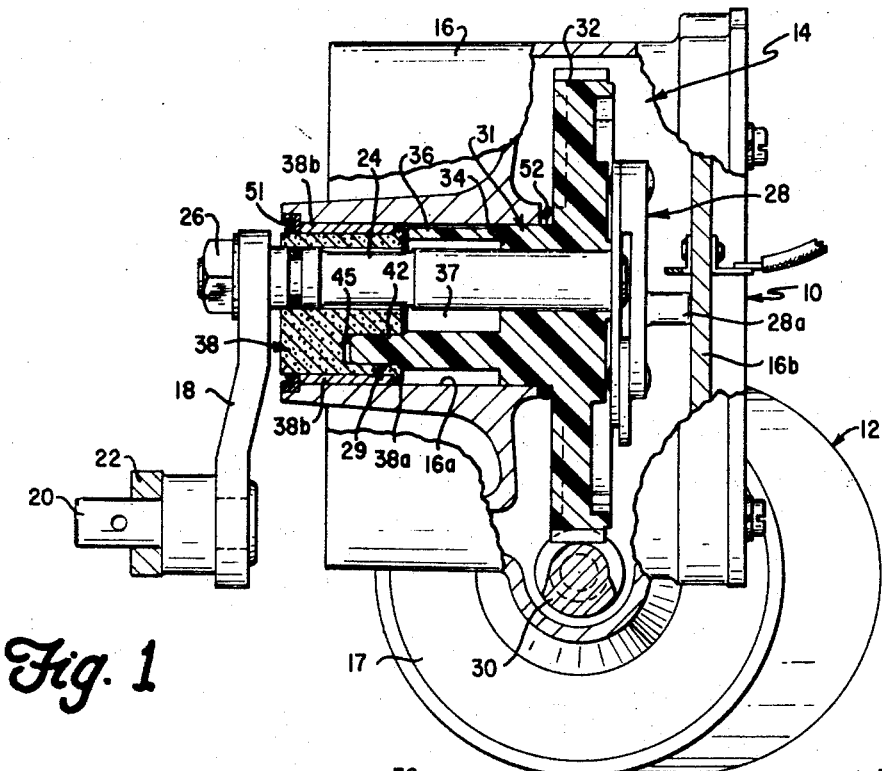
Fig. 1
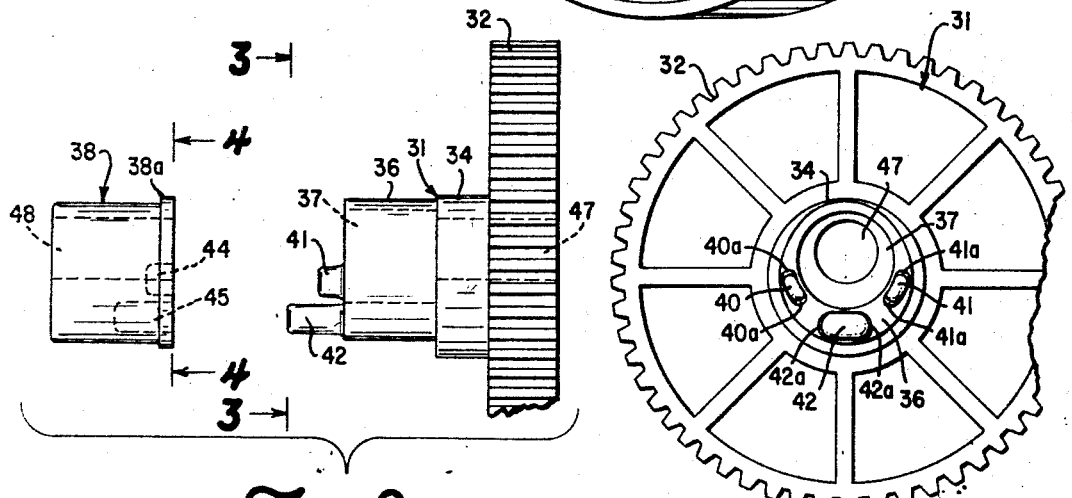
Fig. 2
Fig. 3
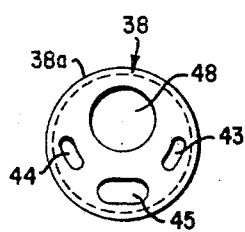
Fig. 4
INVENTORS.
MICHAEL W. CARROLL
DONALD S. PERRY
BY
*S. Henry Stoltenberg*
ATTORNEY

United States Patent Office 3,445,145
Patented May 20, 1969

3,445,145
TWO-PIECE JOURNAL BEARING
Michael W. Carroll, Kalamazoo, Mich., and Donald S. Perry, Fayetteville, N.Y., assignors to Eltra Corporation, Toledo, Ohio
Filed Nov. 22, 1967, Ser. No. 685,161
Int. Cl. F16c *35/02;* F16h *21/18;* B60s *1/06*
U.S. Cl. 308—15                    7 Claims

ABSTRACT OF THE DISCLOSURE

A molded plastic worm gear for transmitting rotary motion in a drive mechanism, the gear having an integral hub portion projecting laterally from one of its sides and having an end configuration so formed as to facilitate manual assembly with a second metal hub member and provide a rotatable driving relation therewith. The assembled members provide a journal for the worm gear. Eccentric bores are formed through both hub members and so located as to be in alignment when the members are in assembled relation to provide an eccentric bearing for a rotatable crank shaft which interlocks with the hub members to transmit motion from the worm gear to a driven member at variable crank lengths.

BACKGROUND OF THE INVENTION

*Field of the invention*

Generally, the field of the invention is electric windshield wipers for automotive vehicles and particularly a portion of a windshield wiper drive mechanism, similar to the drive mechanism shown and described in detail in Patent No. 3,242,520 granted to M. W. Carroll et al., which is assigned to the assignee of this invention. To be more specific, the instant invention is concerned with a two-piece journal bearing structure which projects from one side of a molded plastic worm gear similar in configuration to the general configuration of the worm gear and its integral journal bearing shown in the Carroll et al. patent.

The worm gear is a driven member which rotates about a fixed axis and, in operating relation with other members, transmits rotary motion from a drive means to a windshield wiper linkage system. In the linkage system the rotary motion is transformed to oscillatory motion by a crank to operate a windshield wiper blade in the usual manner. The crank shaft for the crank is positioned in the journal bearing for rotative movement in eccentric relation thereto on an axis parallel with and spaced from the fixed axis of the worm gear and journal and interlocked therewith at selected positions. One end of the crank shaft has the crank arm mounted to rotate therewith which transmits motion to the linkage system, the opposite end of the shaft is provided with an interlock to the gears and a means of actuating a switch mechanism to "Run" or "Park" the wiper blade. For a better understanding of the switch mechanism and other members of the device a study of the Carroll et al. patent is recommended as they form no part of this invention and will not be described further in detail.

*Description of the prior art*

In the past, various journal bearing structures have been devised for use in similar windshield wiper mechanisms to solve both a manufacturer's cost problem and a functional problem of a wiper drive mechanism. With reference to the cost problem, an example of an inexpensive journal bearing structure is that shown in the Carroll et al. patent wherein the full length of the structure is an integral molded hub portion of the worm gear. However, this structure has not proven completely satisfactory due to inherent characteristics of known plastic materials commercially available for such purposes, such as nylon or the like. One undesirable characteristic of such materials is the tendency to "cold-flow" when left idle and/or under a load. This causes distortion of the structure and eventual binding during rotative operation of the device, hence, a functional problem. An example of "load" might be an ice or snow covered windshield.

This problem has been overcome in part by forming an entire journal bearing member of a suitable metal, which will maintain its dimensional stability and embedding one of its ends in a hub portion of a plastic worm gear in such a fashion as to provide a unitary structure. A structure of this type is shown in Patent Nos. 2,985,024 and 3,253,206 to P. R. Contant et al. and R. F. Romanowski, respectively. Although this structure has proven satisfactory in operation it is not completely acceptable due to the cost of the metal member and the expensive method of assembling the two members.

SUMMARY OF THE INVENTION

It has been found that a workable and relatively inexpensive journal bearing structure can be formed with two separable members, one of molded plastic and one of molded sintered metal, both of the members having structural characteristics which will facilitate manual assembly of the members in mass production manufacturing. The molded plastic hub member of the structure is an integral portion of a worm gear and has a cylindrical configuration which is positioned on one side of the worm gear. The sintered metal member comprises the remainder of the journal bearing structure and is spaced from the cylindrical member by an attenuated integral portion of the plastic member.

It is, therefore, a principal object of this invention to provide an improved journal bearing structure for windshield wiper drive mechanisms which will overcome objections of known devices in that the structure provides a minimum of journal bearing area, is easy to assemble, more reliable during operation, and less expensive to produce.

Other objectives and advantages of the invention will be apparent to those skilled in the art upon consideration of the following description and appended claims, reference being had to the accompanying drawings forming a part of this specification wherein like reference characteristics designate like parts in the several views.

BRIEF DESCRIPTION OF THE DRAWING

In the drawing:

FIG. 1 is a view, partly isometric, partly elevational, and partly in section of a windshield wiper drive mechanism and housing, having a portion of the housing broken away;

FIG. 2 is a composite elevational view showing the journal in disassembled form;

FIG. 3 is an end view taken on line 3—3 of FIG. 2; and

FIG. 4 is an end view taken on line 4—4 of FIG. 2.

DESCRIPTION OF A PREFERRED EMBODIMENT

Referring to FIG. 1, a windshield wiper driving device 10 is shown comprising a drive means 12 (in the instant case a reversible electrical motor), and a driven mechanism 14. The driven mechanism is enclosed in a housing 16, the main body of which is usually a cast integral portion of an end housing member 17 of the drive means 12. Mounted to one end of the drive mechanism 14 is a crank arm 18 which is provided at its opposite end with a crank pin 20, having pivotally mounted thereon a connecting link 22. The link 22 is connected to additional linkage of a conventional windshield wiper system, which is not shown and forms no part of this invention.

The crank arm 18 is secured to one end of a crank shaft 24 with a nut 26 in a conventional manner so as to rotate with the crank shaft. At the opposite end of the crank shaft a gear interlock 28 is provided which also operates a switching and parking mechanism 28a, only a portion of which is shown. As stated hereinabove, the interlock and the switching and parking mechanism are fully disclosed and described in Carroll et al. and also forms no part of this invention. The crank shaft 24 is mounted eccentrically as will be described further hereinafter.

The instant invention is concerned with a portion of the driven mechanism, principally a worm gear and journal bearing assembly 29 consisting of two cooperating parts, which is suitably journalled in a bore 16a of the housing 16 and rotatively driven by a worm 30 of the drive means 12 cooperating with the worm gear. One member 31 of the assembly 29 is formed of a suitable plastic and has three distinct but integral portions, the gear portion 32, a journal bearing portion 34, and an intermediate attenuated spacing portion 36 having a clearance cavity 37 formed in its end. The outer cooperating member 38, is formed from sintered metal and is also formed with a cylindrical configuration. As shown in the drawing, the portion 34 is journalled in the bore 16a while the outer metal member 38 is journalled in a separate additional bearing sleeve 38b pressed into the bore 16a.

Both of the members 31 and 38 are provided with interconnecting means which will cause the members to operate substantially as a unitary structure when they are in assembled relation in the housing 16 together with related members of the drive mechanism. This is accomplished, in part, by providing member 31 with three projecting portions 40, 41 and 42 (FIGS. 2, 3 and 4) of varying lengths which are integral with and project outwardly from the free end of the portion 36 preferably disposed on one side of the axis thereof as shown. The angle of projection of each of the portions is such that their axes are parallel with each other and with the axis of the member 31. The complete assembly is accomplished by inserting the projections into cavities 43, 44 and 45 in the adjacent end of the member 38 into which the projections 40, 41 and 42, respectively, are inserted during the assembling operation.

The projecting portions 40, 41 and 42 have elongated oval configurations and two of the projections 40 and 41 are formed with a slight curvature in the elongated mass in such a fashion that the body of each projection is substantially concentric with the cavity 37, better seen in FIGURE 3. It can be seen in FIGURE 4 that the cooperating cavities 43, 44 and 45 in member 38, have substantially the same configuration as the projections to thus interlock with the projecting portions when in assembled relation. Returning to FIGURE 3, the projecting portions are also formed with slight tapers at their ends as shown at 40a, 41a and 42a. The tapers are provided to facilitate assembly of the members 31 and 38 and more important to provide a frictional wedging action in the cavities 43, 44 and 45 which will tend to retain the members in assembled relation after they are pressed together in an assembling operation. The two members 31 and 38 are maintained in assembled relation in the bore 16a of the housing between an end of a bushing 38b and the inner surface of a cover plate 16b of the housing 16 through the switch mechanism 28a which is urged against the gear 32 by the cover plate (FIGURE 1).

The member 31 and the member 38 are provided with aligned bores 47 and 48, respectively, which have identical diameters. When the two members are assembled, their bores have a common axis to thereby provide a bearing means for the rotatable shaft 24. The two bores are so located in their respective members 31 and 38 that their common axis is parallel with the axis of the journal assembly 29, but spaced slightly therefrom in an eccentric fashion which can be utilized to vary the throw of the crank 18 at selected times controlled by the interlock 28.

In the completely assembled drive mechanism (FIG. 1) the bearing bushing sleeve 38b, preferably of sintered bronze, is press fitted into one end of the bore 16a to provide a bearing for the member 38. A conventional seal 51 is provided at the outer exposed end which is also press fitted into the housing bore, and prevents foreign matter from entering the bore.

The annular surface at the inner end of the bushing 38b provides an abutment or thrust bearing surface for an annular cooperating surface of a radially projecting collar portion 38a of the member 38. This arrangement not only provides a thrust bearing for the assembled members, it also provides a stop or retainer for the sintered member 38 should the wedged projections 40, 41 and 42 tend to loosen in the cooperative cavities during operation of the mechanism. A spring washer 52 is also provided in the assembly to allow for tolerance variations of the assembled members in the housing bore 16a, and is positioned between an annular surface of the housing surrounding the bore 16a and the adjacent surface of the gear 32, and limits end to end movement of the assembled members.

It is to be understood that the above detailed description of the present invention is intended to disclose an embodiment thereof to those skilled in the art, but that the invention is not to be construed as limited in its application to the details set forth hereinabove since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a bearing construction for a crank arm for a windshield wiper having a variable controllable throw, a main bearing of relatively large dimension having spaced bearing surfaces positioned on separate cooperating members fitted in the bore of a fixed member, projecting portions on a first member interfitting into sockets in a second member to hold the spaced bearing surfaces in alignment to lock the two members together, and aligning bores in both members eccentrically positioned therein to seat a crank arm shaft to allow variation of the crank arm throw by relative rotation between the shaft and the bearing members.

2. The bearing construction defined in claim 1 further characterized by the first member being fabricated from plastic material, with the second member being fabricated from sintered powdered metal.

3. The bearing construction defined in claim 1 further characterized by tapering the projections on the first member to provide a frictional fit with the sockets in the second member.

4. The bearing construction defined in claim 1 further characterized by providing a self oiling bearing sleeve to cooperate with the sintered powdered metal bearing member.

5. The bearing construction defined in Claim 1 further characterized by a resilient means acting on the first member along its axis to urge the first member against a stop to maintain the bearing elements in predetermined relation.

6. The bearing construction defined in claim 2 further characterized by having at least three projecting portions in the first member and at least three sockets in the second member.

7. The bearing construction defined in claim 1 further characterized by having the spaced bearing surfaces positioned in the terminal portions of the bore in the fixed member.

References Cited

UNITED STATES PATENTS

| 2,122,085 | 6/1938 | Castricone | 308—15 |
| 2,704,232 | 3/1955 | Johnston et al. | 308—15 |
| 2,760,378 | 8/1956 | Van Deventer | 308—15 |
| 3,169,266 | 2/1965 | Crawford | 15—250.17 |
| 3,201,670 | 8/1965 | Myers | 308—15 |
| 3,242,520 | 3/1966 | Carroll et al. | 15—250.17 |

FRED C. MATTERN, JR., *Primary Examiner.*

W. S. RATLIFF, JR., *Assistant Examiner.*

U.S. Cl. X.R.

15—250.17; 74—48